Oct. 26, 1965 M. L. NATLAND 3,214,343
NUCLEAR REACTOR OPERATIONAL IN A WELL BORE
Filed Jan. 3, 1958 3 Sheets-Sheet 1
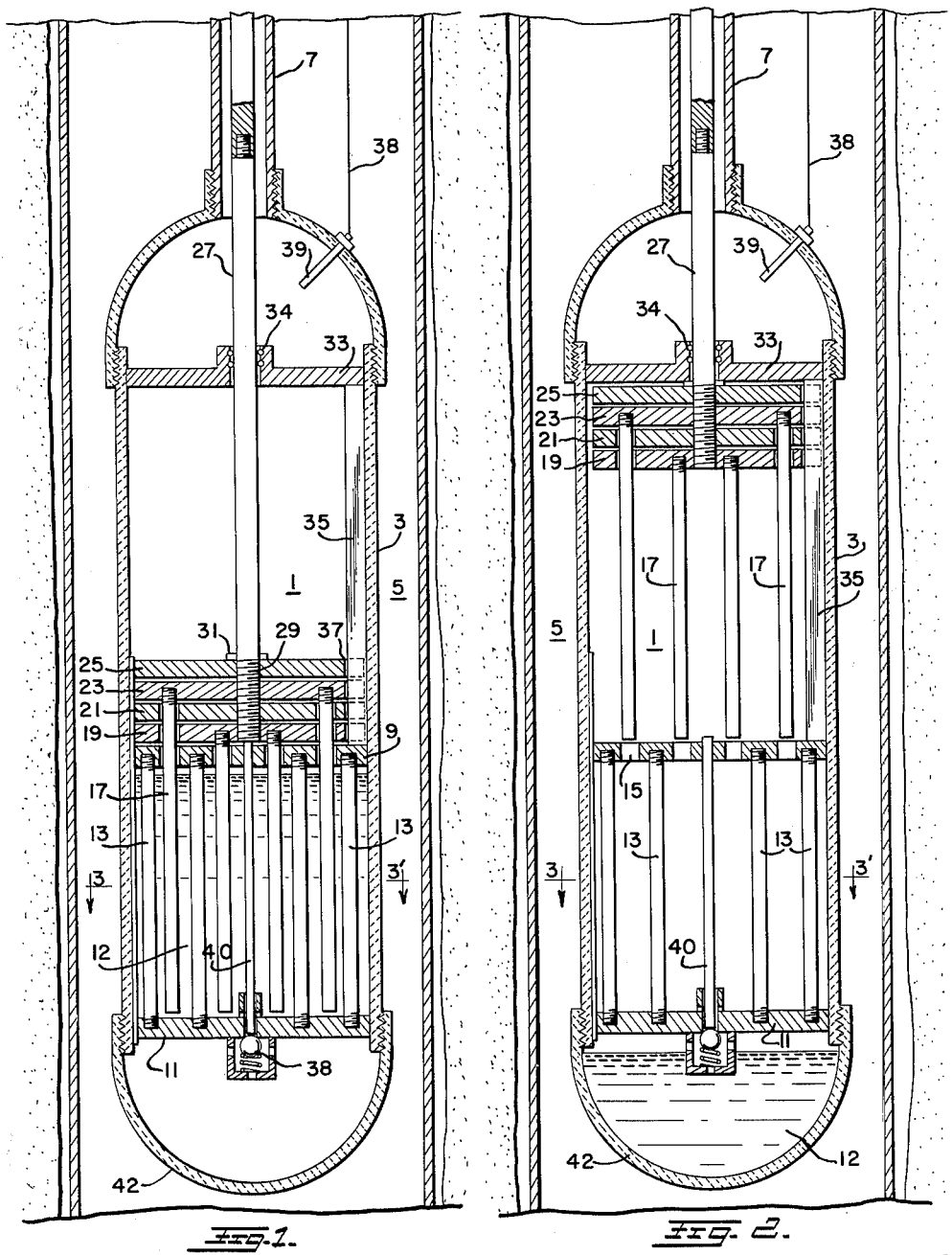
INVENTOR
MANLEY L. NATLAND
BY Adams, Forward and McLean
ATTORNEYS Oct. 26, 1965 M. L. NATLAND 3,214,343
NUCLEAR REACTOR OPERATIONAL IN A WELL BORE
Filed Jan. 3, 1958 3 Sheets-Sheet 2
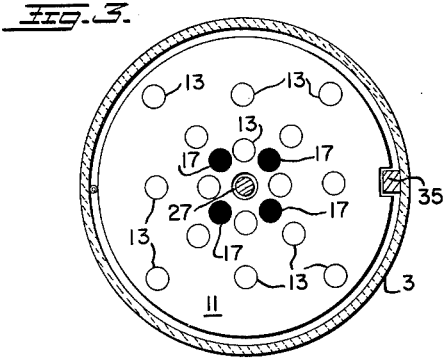
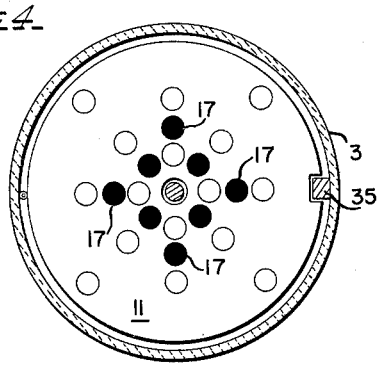
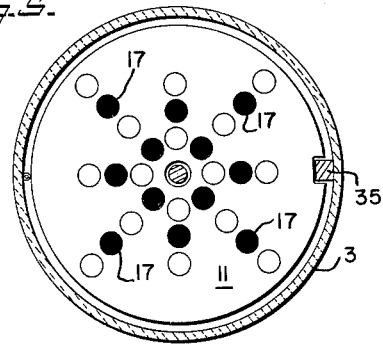
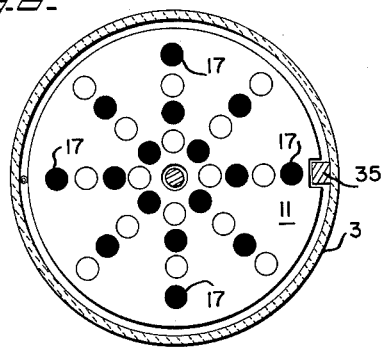
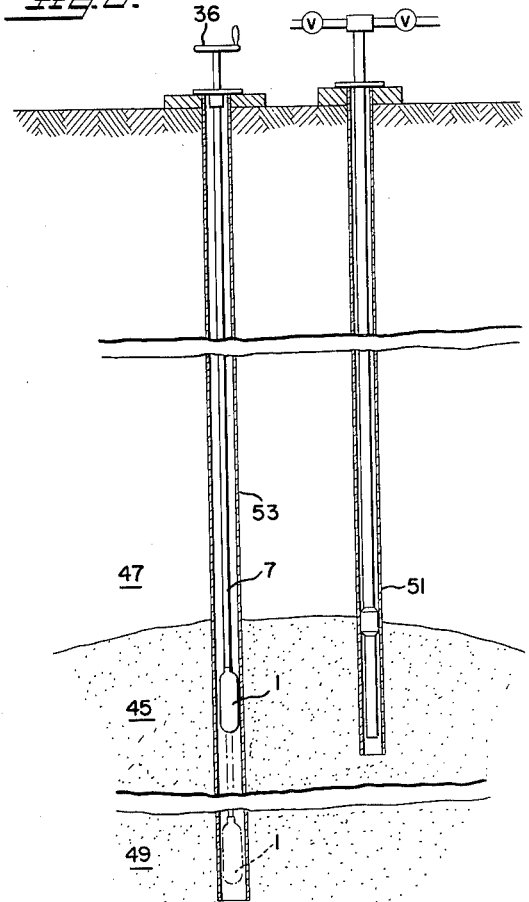
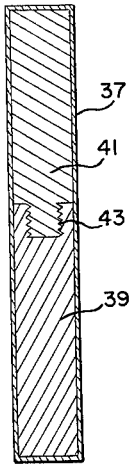
INVENTOR
MANLEY L. NATLAND
BY Adams, Forward and McLean
ATTORNEYS

3,214,343
NUCLEAR REACTOR OPERATIONAL IN A WELL BORE

Manley L. Natland, Rolling Hills, Calif., assignor to Richfield Oil Corporation, Los Angeles, Calif., a corporation of Delaware
Filed Jan. 3, 1958, Ser. No. 706,960
2 Claims. (Cl. 176—21)

This application is a continuation-in-part of my application Serial No. 675,637, filed August 1, 1957, now abandoned.

The present invention relates to nuclear reactors which are operational below the surface of the earth as in a well bore traversing a subsurface oil-bearing stratum. More particularly, the present invention pertains to nuclear reactors of the fast type which when positioned in a well bore traversing or in the vicinity of an oil-bearing stratum will serve as an aid to the recovery of the petroleum contained in the stratum.

Numerous methods and apparatuses have been proposed for the improvement of petroleum recoveries from subsurface formations and these have included such things as the suspension of electric heaters adjacent the formation, introduction of heated fluids into the formation under pressure, ignition of oil or gas in the lower portion of the well, the establishment of a combustion wave in the formation, etc. The purpose of all these methods and apparatuses has been to furnish an aid to the recovery of oil in the formation either by reducing the viscosity of the oil in the bore hole and surrounding formation or by reducing the viscosity and applying pressure to the petroleum so that it is forced through the formation and into one or more output wells located nearby. All of these methods have, however, met with certain difficulties such as the loss of heat in the heated fluid method, uncertainty of combustion and non-uniformity of heat output in the combustible gas methods, etc. The apparatuses in effecting these methods have also proven unreliable and unwieldy due to the necessity of numerous pipes and tubings in the bore hole and insulation difficulties in the electrically heating apparatuses.

Now in accordance with the present invention I have provided an apparatus which is useful in any method wherein heating of a well bore or surrounding formation is desired, be they primary or secondary recovery methods, and which is easily controllable from the surface of the earth to produce a high degree of heat or which by proper manipulation can be caused to produce high pressures as well as heat, the resultant high pressures serving to force the oil into one or more output wells or if desired, serving to fracture the oil-bearing formation thus rendering it more permeable to fluids. In particular the present apparatus can be most advantageously used in those areas of the world where heat sources are at a premium; for instance in recovering oil from the Athabasca tar sands located in Canada.

The apparatus of the present invention includes a nuclear reactor of the fast type which is capable of being positioned at a remote distance from the earth's surface and when so positioned can be activated and controlled from the earth's surface. The nuclear reactor of the present invention can be operated in either of two ways. It can be operated as a controlled fast reactor in which case the reactor will be positioned adjacent the oil-bearing formation and the heat energy released as a result of the self-sustained nuclear reaction to result in a lowering of the viscosity of the petroleum in the formation thereby rendering it more flowable into the well heated or into an adjacent output well. Alternatively the fast reactor of the present invention can be operated in a manner so as to provide a nuclear explosion thereby creating not only high temperatures in the oil-bearing zone but also serving to simultaneously pressurize the formation. Thus, the apparatus of the present invention is particularily useful in those oil recovery methods wherein the petroleum in the formation is driven to one or more output wells located around the site of the nuclear explosion.

In operating the present apparatus to obtain an uncontrolled reaction, the petroleum and the formation immediately there surrounding may be destroyed due to the high temperature and the intense radiation but this temperature and radiation will be abated in a short distance by the confining surrounding rock formation and the heat will there after be radiated outward into the formation at a sufficient temperature to improve the recovery of the oil but not sufficiently high to have deleterious effects thereupon. Of course, when operating the apparatus in this manner, the reactor need not be positioned in the oil-bearing stratum but it can be positioned at a point below or if desired above the oil-bearing stratum thus eliminating the destruction of the oil formation surrounding the blast site. By placing the reactor a sufficient depth below the earth's surface the heat and pressure will be contained by the overlying formation and the heat will be slowly released to the contiguous oil-bearing formation, the degree of heat reaching the oil formation depending upon the distance between the site of explosion and the oil bearing formation and the intensity of the explosion.

It is generally known that the bombardment of fissionable isotopes such as U 239, U 233 and U 235 with neutrons will result in the fissioning of the isotope nuclei with a resultant large release of energy in the form of heat. The fission of such nuclei on the average results in a release of approximately two fast or high energy level neutrons which are in turn capable of causing fission of additional nuclei. If the fissionable nuclei are present in what is termed the critical mass and the neutron density or flux is allowed to attain or exceed a certain minimum level, i.e. unity, the fission reaction can become self-sustained. This means that for a nuclear reaction system to become self-sustained the production of neutrons as a result of fission must at least be equal to the loss of neutrons from the system due to fission, capture, escape, etc. Due to this reproduction factor of about 2 for each neutron used in causing fission, it is obvious that the number of neutrons in the system will rise in an exponential manner if there are no poisoning materials, i.e. materials which absorb neutrons without fissioning, and there are no neutron escapes from the system. Thus, because of this exponential rise in the neutron flux the system can become explosive if no means are provided to limit or control the neutron densities. This control of neutron densities in the system can be accomplished by providing varying amounts of a poisoning or neutron-absorbing material therein.

The apparatus of the present invention provided for heating, pressuring and/or rendering more permeable the underground oil-bearing formation includes a fast nuclear reactor positioned in the well bore and at a substantial distance from the earth's surface. The reactor can be provided with means to control the extent of nuclear reaction taking place therein by manipulation from the earth's surface and can be constructed so that the reactor is automatically deactivated upon the attainment of certain temperatures and can thereafter be reactivated at a higher power or heat output if desired than when automatically deactivated also by means manipulated from the earth's surface. Moreover the reactor can be caused to explode by means operable from the earth's surface.

More specifically, the present invention may be more fully understood by reference to the following drawings wherein:

FIGURE 1 is a cross-sectional view of my nuclear reactor in its inactive state shown in relation to an oil well bore hole;

FIGURE 2 is a cross-sectional view of my nuclear reactor in its fully activated state;

FIGURES 3 to 6 show plan views taken through line 3–3' of FIGURES 1 and 2 of my nuclear reactor in varying states of activation;

FIGURE 7 shows a cross-sectional view through a modification of a fissionable fuel element for use in the reactor of FIGURES 1 and 2;

FIGURE 8 shows a schematic representation of my nuclear reactor positioned in relation to the oil-bearing stratum.

Figure 9:
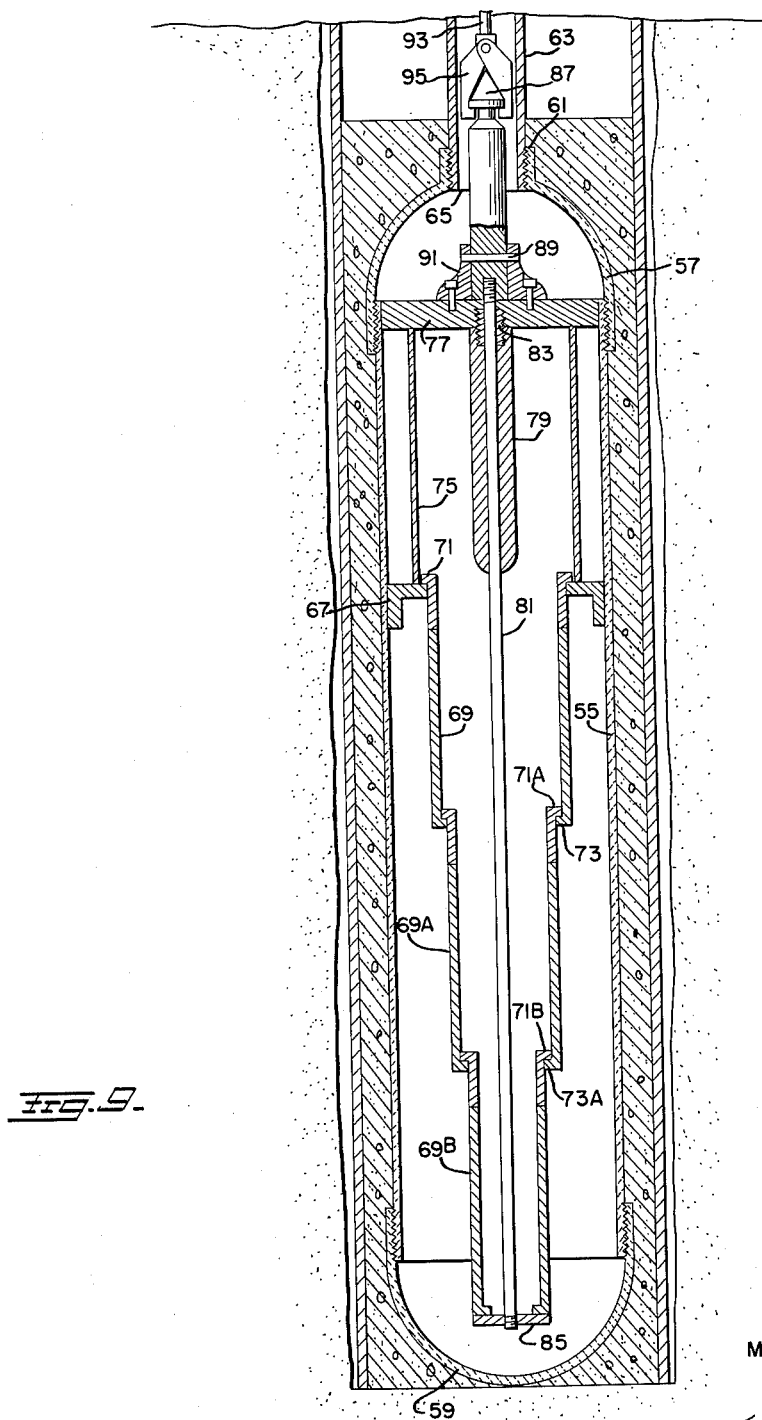
FIGURE 9 shows a modification of a nuclear reactive device similar to that described in FIGURES 1 and 2.

Referring now to FIGURES 1 and 2, the reactor 1 comprises an elongated cylindrical reactor case 3 suspended in bore hole 5 by tubing string 7 extending downwardly from the earth's surface. Case 3 can be composed of any suitable heat resistant material such as a ceramic or an alloy steel and if desired can be provided with a coating of a neutron reflecting material e.g. beryllium (not shown) in order to minimize the neutron losses from the reaction system. Anchored by any suitable means within case 3 are plates 9 and 11 having fixedly connected therebetween a plurality of fast neutron fissionable elements 13. Plates 9 and 11 can be composed of any suitable material having a small neutron capture cross-section such as beryllium, zirconium, aluminum, etc. Due to the high temperatures which will be produced within the reactor 1 it is preferred that these plates be constructed of a high melting point material, e.g. zirconium.

Upper plate 9 has provided therethrough openings 15 for the admission of the hereinafter described neutron-absorbing rods 17. Rods 17 as more clearly shown in FIGURES 3 through 6 are insertable between each of the concentrically arranged fissionable elements 13. Rods 17 are fixedly suspended from a series of holders 19, 21, 23 and 25. The holders 19, 21, 23 and 25 are constructed so that they each have fixedly suspended therefrom neutron-absorbing rods 17 and each of the holders 19, 21 and 23 have perforations therethrough so that the absorbing rods 17 suspended from the successively higher holders are slidably insertable therethrough and into the cluster of uranium elements 13 in the manner indicated in FIGURES 3 through 6. Each of the holders is threadably engaged centrally thereof with rod 27 extending downwardly from the earth's surface through the tubing string 7 and into the reactor case 3, the lower end of rod 27 being provided with threads 29 and retaining collar 31.

If desired a guide 33 can be provided in the upper section of casing 3, through which is inserted rod 27. The opening in guide 33 through which extends rod 27 can be provided with O ring seal 34. In order to maintain the rods 17 in the predetermined position between the fissionable elements 13, I have provided track 35 extending along the inside length of case 3, and grooves 37 in each of the holders 19, 21, 23 and 25 slidably engaged with track 35. As shown in FIGURES 1 and 2 the absorbing rods 17 can be either lowered into or completely removed from the cluster of fissionable elements 13 by manipulation from the earth's surface as by engaging the threaded holders 19, 21, 23 and 25 with rod 27 and lowering or raising rod 27 by any convenient means manipulatable from the earth's surface such as by hand wheel 36 (FIGURE 8). It is, of course, possible to leave as many rods as desired within the cluster of fissionable elements by unscrewing the lowermost holder 19 and withdrawing the upper three; unscrewing the lower two holders 19 and 21 and withdrawing the upper two, etc. Thus by proper manipulation the degree of fission taking place within the cluster of fissionable elements can be controlled to any extent desired by withdrawing or inserting the desired amount of neutron absorbing material within the active cluster of fissionable elements. Thermowell 39 having a thermocouple therein is provided in the upper portion of reaction case 3 and is in communication with an above surface temperature registering device (not shown) by means of insulated cable 38. If desired of course thermowell 39 need not be located in the position shown but it can be provided at any convenient location or proximity to reaction 1.

As mentioned previously FIGURES 3 through 6 are plan views through line 3–3' of the reactor of FIGURES 1 and 2 and show the cluster of fissionable elements 13 having inserted therebetween the neutron-absorbing rods 17. In these figures fissionable elements 12 are represented by circles and absorbing rods 17 by the solid dots. FIGURES 3 through 5 show the spacing pattern between the elements 13 and rods 17 as the successive plates 19, 21, 23 are lowered into the reactive chamber and FIGURE 6 shows the absorbing rod-fissionable element spacing pattern when all of the rods 17 are fully inserted into the cluster of fissionable elements 13.

The fissionable elements 12 are constructed and arranged in such a manner that a controlled self-sustained nuclear reaction can be effected upon the withdrawal of the neutron absorbing material from the vicinity of the fissionable rods. Generally, in a reactor of this type the initial mass of the fissionable material necessary to produce a self-sustained chain reaction can be in the range of about 2 to 500 pounds depending upon the geometric arrangement of the fissionable rods and the number of neutrons lost from the system. This total critical mass of the fissionable nuclei can be distributed between as many elements 13 as desired with each of the elements containing an equal or unequal amount of the fissionable nuclei. The fissionable nuclei can be distributed in a non-fissionable material if desired, and the concentration of the fissionable material can be about 2 percent or greater. Thus the fissionable elements 13 for use in the present apparatus can be composed of natural uranium enriched with the fissionable isotope U 235 up to at least a concentration of about 2 percent and preferably the U 235 will be present in substantially higher concentrations, for instance, up to about 80 to 95 percent, and the total mass of the U 235 in the system when using the higher concentrations of U 235 can be about 2 to 500 pounds dependent upon the number of elements containing the mass, and the geometric spacing pattern employed. The fissionable elements 13 can be the form of cylindrical rods, the length and diameter of which will be dependent upon the number of fissionable elements 13 in the particular system and their geometric arrangement within the reactive zone. As shown in the present drawings, I have provided only 16 fissionable elements 13. However, it is to be understood that many more can be provided, e.g. 100 or more if desired and it is not necessary that a neutron absorbing rod 17 be insertable between each of the elements 13. For instance, the neutron fluxes or densities within the reactive mass may be controllable by the use of only one neutron absorber.

Rods 17 can be composed of any suitable material which has a high neutron capture cross section such as boron or cadmium. The concentration of this material in each of the rods 17 or the total amount of this material which can be introduced into the reactive section will be such that upon complete introduction into the reactive section a sufficient amount thereof will be present to furnish a completely safe reactor design. In some instances, as noted previously, this can be accomplished by the introduction of one neutron absorbing rod. Under some circumstances the boron or cadmium is not effective in removing neutrons of certain energy levels. If it is found that these more difficulty removable neutrons are present in excessively dangerous densities, I can provide an auxiliary absorbing material in the reactive case which will assist in removing or absorbing these neutrons. For instance, as shown in FIGURE 1 I can provide a material such as mercury 12 and this material can be present in the reactive case at all times prior to instigating the nuclear reaction. In order to remove this auxiliary material from the reactive case prior to initiating the nuclear reaction I can provide a spring biased valve as shown at 38 and located on bottom plate 11. Valve 38 can be actuated as by member 40 contacting the valve 38 and extending upward through plate 9 and into contact with the lower end of rod 27 when it is fully positioned within plates 19, 21, 23 and 25. As shown sufficient clearance is provided between plate 25 and collar 31 so that rod 27 can depress member 40 thus opening valve 38 and allowing the mercury to flow from the reactive case into the lower section 42 of casing 3.

As mentioned previously it is also possible to construct the present reactor so that upon the attainment of a predetermined reactivity the reactor will automatically become deactivated and, when desired, the reactor can again be activated at a much higher power or heat output or even be caused to explode. Such a procedure at this can prove very beneficial when both high temperatures and pressures need be applied to the subterranean formation. For instance, the nuclear reactor in its first stage of reactivity can be controlled to produce a predetermined amount of heat, the heat being transmitted to the oil-bearing formation thus reducing the viscosity of the petroleum contained therein. Upon the attainment of the desired temperature the reactor will automatically become deactivated. At any time thereafter the nuclear chain reaction can again be instituted by manipulation from the earth's surface and can if desired be brought to a higher operating temperature than previously achieved or if desired, the reactor can be caused to explode thus establishing a pressure wave through the formation, driving the hot petroleum to output wells around the nuclear reactor.

In order to bring about this result, I can provide the reactor as shown in FIGURES 1 and 2 and described above with the fissionable element 37 shown in FIGURE 7 which is comprised of two sections, 39 and 41 joined together as by threads 43. In this modification lower section 39 of fissionable element 37 is composed of U 235 or similar fissionable material dispersed in or in solution in a relatively low melting point non-fissionable material, and the upper section 41 of fissionable element 37 contains U 235 or similar fissionable material dispersed in a relatively higher melting point non-fissionable material. For instance, lower section 39 can be comprised essentially of U 235 dispersed in a natural uranium alloy in amounts of at least about 2 percent of U 235 and upper section 41 can be comprised of at least about 2 percent U 235 dispersed in a thorium alloy. It is to be understood that when constructing the element 37 as hereinabove described the total mass of the fissionable material in each of the sections 39 and 41 must be equal to the critical mass of the particular system. That is the total mass of the fissionable material in the lower section 39 of all the elements 37 placed in the reactor 1 can be about 2 to 500 pounds depending upon the particular system and that the total mass of the fissionable material contained in the upper sections 41 of all the elements can also be equal to a sum in the indicated range. In either manner of constructing the fissionable elements, i.e. element 13 or element 37, the fissionable fuel can be contained in a thin sheath of non-reactive material in order to minimize corrosion of the fissionable material by water, etc. and to prevent the escape of radioactive fission products into the system. For instance, the fissionable element can be clad with a .004 inch layer of sponge zirconium metallurgically bonded to the fuel element.

The operation of the above-disclosed nuclear reactor can be described in relation to its use as an aid to subsurface petroleum recovery as follows. FIGURE 8 shows a cross-sectional view of a petroleum-bearing subsurface stratum 45 having overlying and underlying impermeable formations 47 and 49, respectively. Traversing impermeable formation 47 and oil-bearing stratum 45 is an output bore hole 51 equipped with the usual tubing string and above surface flowing equipment. There can be one or more output bores 51 drilled into the oil-bearing stratum if desired.

There is further provided bore hole 53 for accommodating the nuclear reactor shown in FIGURES 1 and 2 and hereinabove described with the formations surrounding said bore hole serving as substantially the only coolant and radiation shield for the reactor. The diameter of bore hole 53 will be such that the nuclear reactor can be lowered therein and a plurality of these bore holes can be provided if desired or needed. The nuclear reactor 1 is charged with fissionable elements 13 at the surface of the earth. Since the reactor when fully charged will contain the critical mass of the fissionable material for this particular system the neutron-absorbing rods 17 are fully inserted into the cluster of fissionable elements 13 in order to reduce and maintain the neutron flux at a value less than unity, thereby insuring against the possibility of fission build-up. With the critical mass of fissionable material in place and the rods 17 fully inserted, the reactor 1 is lowered into the desired position by means of tubing string 7 and a suitable above surface drawworks (not shown). As indicated in FIGURE 8 the reactor 1 is lowered into the area of the oil bearing stratum 45 and in proximity to the output well 51. However, in another phase of operation hereinafter to be explained the reactor can be lowered to a suitable depth below the oil-bearing stratum 45 and into the underlying impermeable formation 49. When positioned as shown in FIGURE 8 rod 27 can be run down the inside of tubing string 7 and into the interior of reactor 1 wherein the threaded end 29 of rod 27 can be caused to engage with the threaded central annulus of neutron absorbing rod holders 19, 21, 23, and 25. By proper manipulation as by hand wheel 36 rod 27 can be caused to engage with all or any one of the holders 19, 21, 23 and 25 thus providing a means of removing one or all of the absorbing rod units from the cluster of fissionable elements 13. When it is desired to activate the nuclear reactor, rod 27 is withdrawn to any extent desired by means of hand wheel 36 thus withdrawing the desired amount of absorbing material from the cluster fissionable elements. As the absorbing material is withdrawn the neutron flux within the critical mass builds up and when the minimum flux i.e. unity is attained, the nuclear chain reaction becomes self-sustained. The energy output or heat from the reactor is controlled by removing or inserting more or less of the neutron-absorbing material into the critical mass by proper manipulation of the hand wheel thus decreasing or increasing the intensity of fission and thus the temperature. The temperature within the chamber is indicated at the earth's surface by the thermocouple 39 suitably located in or near the reactor and in communication with a temperature recording device at the earth's surface by means of cable 38. Proper adjustment of the absorbing rods can be made when the temperature indicator registers an increase or decrease in temperatures beyond predetermined maximum or minimum points. By operating in this manner a controlled fast nuclear reaction is attained and the petroleum contained in the surrounding formation can be heated to any desired degree e.g. 500 to 2000° F. thus rendering it less viscous and more easily recoverable as from output well 51.

If it is desired to first heat the oil-bearing formation and then subsequently pressurize the formation, the apparatus of the present invention can be operated in the following manner. The reactor 1 is charged with the fissionable elements 37 shown in FIGURE 7 in a manner substantially the same as indicated above. The reactor 1 is lowered to the desired position in the oil-bearing stratum 45 by means of tubing string 7. When thus positioned rod 27 is run down the tubing string 7 and the threaded end thereof is caused to engage with holders 19, 21, 23 and 25 in the above-described manner. The rod 27 is withdrawn a sufficient distance to remove the neutron-absorbing rods 17 from the vicinity of the lower section 39 of elements 37. Since the lower sections 39 of elements 37 contain a critical mass of the fissionable isotope a self-sustained chain reaction will be instituted and the reaction can be caused to proceed until such a time as the temperature of the reaction attains the melting point of the natural uranium alloy. At this point the lower sections 39 will melt causing the geometry of the critical mass to be destroyed thus stopping the chain reaction. Since the upper sections 41 of the elements 37 contain a higher melting point alloy, they will remain intact and since the neutron-absorbing rods 15 are still inserted among these elements no chain reaction is possible therein. Due to the high temperature attained by the chain reaction before destruction of the fissionable geometry, e.g. up to about 1200° C., the petroleum in the oil-bearing formation will be heated to a high temperature thus rendering it more easily recoverable as through production bore hole 51.

At this point the recovery of the petroleum in the oil-bearing formation can be greatly enhanced as by the application of high pressures to the formation. To accomplish this purpose the fast reactor is constructed so that a nuclear explosion can be obtained by manipulation of the reactor from the earth's surface. As set forth above the upper sections 41 of elements 37 also contain a critical mass of U 235 arranged in a critical geometry and this section would be chain reacting except for the presence of the neutron-absorbing rods 17 in the cluster of elements 37. Generally, a nuclear explosion is due to the exceedingly fast rate of neutron build-up within a reaction system and therefore, an exceedingly rapid rate of energy release. This vast amount of energy liberated in an exceedingly short period of time results in the well known nuclear explosion. In order to accomplish this fast build-up of neutrons in the system the critical mass must be brought together extremely fast under conditions such that there is very little neutron absorption or loss from the system. In the present apparatus I have accomplished this result by providing the critical mass of the fission material but have limited the neutron build-up by the presence of a neutron-absorbing material in the critical mass. Thus in order to instigate a nuclear explosion the neutron-absorbing material must be withdrawn from the critical mass very quickly thereby allowing rapid neutron build-up. To accomplish this rapid withdrawal of the neutron-absorbing rods 17 from the critical mass of fission material contained in the upper sections 41 of elements 37 I can provide a shaped explosive charge or other similar means acting upon rod 27 at the surface of the earth thus permitting the rapid withdrawal of the absorbing rods 17 from the reactive area.

The resulting nuclear explosion will, of course, destroy the geological formation and the petroleum contained therein for a certain area surrounding the blast site and will create an area of intense heat, e.g. up to ½ to 1 million degrees F. or more but these high temperatures will not prove deleterious to the major portion of the formation since the heat will be contained by the rock pressure surrounding the blast site and the heat in this area will be slowly released to the surrounding stratum thereby serving as a self-contained heat source for a long period of time. The destructive effect of such an explosion can, of course, be minimized by limiting the intensity of the nuclear reaction. For instance, the critical mass can be adjusted to the minimum value necessary for a self-sustained chain reaction and the explosion can be rendered less efficient by withdrawing the absorbing rods at a slightly slower rate thereby failing to utilize the full amount of fission material and failing to realize a maximum release of energy.

It is also possible to operate the present reactor in such a manner that little deleterious effects will be produced in the oil-bearing formation. For instance, instead of positioning the reactor 1 in the bore hole 53 adjacent to or in the oil-bearing stratum 45, I can lower the reactor so that it is positioned in the underlying formation 49 at a distance sufficiently removed from the oil-bearing stratum so that the resultant nuclear explosion will not come in direct contact with the petroleum bearing stratum. In this method of operation the exact distance between the oil-bearing stratum 45 and the nuclear reactor can vary over a wide range, depending primarily upon the intensity of the nuclear explosion and the nature of the formation in which the explosion takes place, i.e. its thermal conductivity. By exploding the nuclear reactor in the underlying formation 49 a large cell of vaporized rock is produced surrounded by a shell of molten rock. This hot cell of gases and rock can be at a temperature of upwardly of 1 million degrees F. or more. The surrounding rock formation which has not been vaporized or melted as a result of the explosion will act as an insulating covering for the hot cell and will conduct the heat therefrom in an ever expanding thermal wave of decreasing temperatures. These thermal waves will progress through the underlying formation 49 and into the oil-bearing stratum 45 causing a decrease in the viscosity of the petroleum contained therein and rendering it more easily recoverable. In this method the desired temperature to be imparted to the oil bearing stratum is adjusted by the intensity of the nuclear explosion and the distance between the site of the explosion and the oil-bearing stratum. Recovery of oil can be from output wells drilled to the oil-bearing stratum or from the upper portion of the well in which the explosion takes place.

The device of the present invention can, of course, be suitably modified such as for instance, as shown in FIGURE 9. The device as shown in this figure can be very beneficial in those methods wherein high temperatures and pressures are to be simultaneously applied to the formation.

Referring now to FIGURE 9 the nuclear explosive device comprises an elongated cylindrical case 55 having its ends closed as by caps 57 and 59. Case 55 can be constructed of any material found desirable such as an alloy steel and can be provided with a layer of neutron reflecting material (not shown) such as beryllium. Cap 57 closing the upper end of case 55 can be threadedly attached as at 61 to tubing string 63 and an opening 65 can be provided therethrough in order to permit communication between the earth's surface and the interior of the case 55 as through tubing string 63. Within case 55, I provide an annular lip 67 suitably affixed to the interior wall of casing 55. Suspended from lip 67 I provide a series of annular fissionable fuel elements 69, 69A and 69B. Fuel elements 69 and 69B are constructed so that the successively lower elements will slidably enter the higher elements and they can be suspended one from the other as by flanges 71, 71A and 71B, flanges 71A and 71B engaging lips 73 and 73A, respectively, on the bottom of the next higher elements and flange 71 engaging the above-described lip 67. Thus the elements 69 are telescopically extensible one within the other and the fuel elements 69, 69A and 69B are slidably suspended from the lip 67.

Supported by lip 67, I further provide annular fissionable element 75, the internal diameter of which is sufficient to allow the above-mentioned annular elements 69, etc. to slidably fit therein. Above the element 75 I provide plate 77 threadedly connected to case 55. Fixedly suspended from the center of plate 77 I provide a fifth annular fissionable element 79, the outside diameter of which is sufficient to be slidably inserted into the annular element 69B and the inside diameter of which is sufficient to allow the passage of a hereinafter-described rod 81. It is preferred that the internal diameter of element 79 be at least about 6 inches to insure against the attainment of a critical mass when the device is in extended position as shown in FIGURE 9. An opening 83 is provided centrally of plate 77 and contiguous with the inside diameter of element 79 for the admission of rod 81. Rod 81 extends downwardly through plate 77 and element 79 and is affixed to bottom plate 85 of element 69B as by threads or similar means. The upper end of rod 81, protruding past plate 77, is affixed to a grasping means 87, herein shown in the shape of a spearhead. If desired, of course, rod 81 can be in one piece with its upper end shaped in the form of the spearhead. Rod 81 is held in the lowered position by shear pin 89 fitted into guide 91. This shear pin can be relatively strong to guard against the possibility of accidentally raising rod 81.

A means can be provided to act as a source of neutrons when the nuclear explosive device is at subcritical levels. For instance, beryllium metal can be applied as a coating on the inside of annular element 75 or on the lower part of rod 81.

The five annular fissionable elements 69, 69A, 69B, 75 and 79 can have a combined mass at least equal to or greater than the critical mass for the system and each of the elements can contain only a fraction of the total critical mass. For instance, each of the annular elements can contain about 100 pounds of U 235 and this U 235 can be dispersed in about 5 percent natural uranium with the remainder being the fissionable isotope. Since it is desirable that each of the elements individually be non-explosive the thickness of the annulus of each of the elements is at least less than the diameter of a sphere containing a critical mass of U 235. However, the sum of the thickness of the five annuluses must be at least as great as the diameter of a sphere containing the critical mass of U 235. For example, the diameter of a sphere containing a critical mass of pure U 235 can be about 6.8 inches. Thus in the case wherein pure U 235 is used in the present device the thickness of each of the annuluses could be at least about 1.4 inches, if the masses in each of the elements were all equal, but in any event none should exceed the critical spherical diameter. The height of the annular elements can be any that is found convenient since a fissionable mass having less than the critical diameter can be infinitely high. The spacing between each of the annular fissionable elements should not exceed about 0.2 of an inch. The annular elements 69, 69A and 69B can be structurally reinforced as by providing a thin sheath of supporting metal around the fissionable fuel material. For instance, a 0.004 inch thickness of sponge zirconium can be metallurgically bonded to the fuel material and vertical and radial steel fins can be placed on the outside of the sheath. If this is done the sheath and fins cannot protrude more than 0.1 of an inch in order to provide the above-indicated 0.2 inch clearance between the adjacent elements. It is to be understood, however, that more or less of the annular elements can be provided so long as no one of the elements contain the critical mass and that the summation of their masses at least exceeds the critical mass necessary for the particular system.

In order to insure against the accidental accumulation of a critical mass each of the annular fissionable elements can be constructed so that the upper part thereof in contact or adjacent to the next higher element is composed of a non-fissionable material. For instance, as shown in FIGURE 9 a small portion, e.g., 1 to 3 inches of the upper parts of elements 69, 69A and 69B can be composed of steel or the like non-fissionable material.

The operation of the above-described device can be similar to that discussed in conjunction with FIGURE 8. For instance, the device of FIGURE 9, with the annular elements in their extended position can be placed in bore hole 53 at the desired location in proximity to the oil-bearing stratum 45. By bringing the annular fissionable elements 69, 69A and 69B rapidly into juxtaposition with the annular fissionable elements 75 and 79, a critical mass can be attained resulting in a nuclear explosion. The fissionable elements can be rapidly brought into juxtaposition in any one of a number of ways. For instance, a line 93 having an overshot latch 95 can be lowered from the surface of the earth through tubing string 63 and caused to engage with spearhead 87. When desired the line 93 having the overshot latch 95 attached to spearhead 87 can be quickly withdrawn, thus lifting rod 81 and elements 69B, 69A and 69 upward into juxtaposition with elements 75 and 79. Alternatively, a shaped explosive charge could be placed in the bottom of casing 55 and directed against bottom plate 85, and when desired the charge could be fired by any suitable electrical means, the force of this explosive charge rapidly forcing the annular elements upward into a critical mass. The effect of such a nuclear explosion would, of course, produce substantially the same results as obtained when using the device shown in FIGURES 1 and 2.

I claim:

1. An apparatus for heating a subsurface oil-bearing stratum which comprises a fast nuclear reactor positioned in a well bore in proximity to the oil-bearing stratum, said reactor including, a reactive case, fast neutron fissionable material positioned in said case, said fissionable material being divided into two portions, each portion being dispersed in a non-fissionable alloy having differing melting points and each portion having a mass of fast fissionable material at least equal to a critical mass, said reactor comprising a source of neutrons for contacting the fissionable material and means at the earth's surface for adjusting the intensity of the fission reaction in each of the said portions by varying the amount of a neutron absorbing material opposite each of the portions of fissionable material, the formations surrounding said well bore serving as substantially the only coolant and radiation shield for the reactor.

2. An apparatus for heating a subsurface oil-bearing stratum which comprises, a fast nuclear reactor positioned in a well bore in proximity to the oil-bearing stratum, said reactor including, a reactive case, cylindrical rods of fast neutron fissionable material vertically suspended in said case, said rods being divided into an upper and lower portion, said lower portion containing at least a critical mass of said fissionable material dispersed in a non-fissionable relatively low melting point material and said upper portion containing at least a critical mass of said fissionable material dispersed in a non-fissionable relatively high melting point material, said reactor comprising a source of neutrons for contacting said fissionable material and means at the earth's surface for adjusting the intensity of the fission reaction consecutively in the lower and upper portions of the said rods by varying the amount of a neutron absorbing material opposite each of the portions, the formations surrounding said well bore serving as substantially the only coolant and radiation shield for the reactor.

References Cited by the Examiner

UNITED STATES PATENTS

| | | | |
|---|---|---|---|
| 2,685,930 | 8/54 | Albaugh | 166—39 |
| 2,804,150 | 9/57 | Fuson | 166—63 |
| 2,841,545 | 7/58 | Zinn | 204—193.2 |
| 2,870,076 | 1/59 | Koch | 204—193.2 |
| 2,887,954 | 5/59 | Swed | 102—24 |
| 2,892,407 | 6/59 | MacLeod | 102—24 |
| 2,951,943 | 9/60 | Goodman | 250—83.3 |
| 3,080,918 | 3/63 | Natland | 166—11 |

(Other references on following page)

FOREIGN PATENTS 971,324 7/50 France.
1,147,517 6/57 France.
252,909 10/48 Switzerland.

OTHER REFERENCES

Uren: Petroleum Production Engineering, Oil Field Development, 3rd. ed. (1946), pp. 588–593, McGraw-Hill Book Co., N.Y.

Glasstone: Principles of Nuclear Reactor Engineering, July 1955, pp. 18–55, 832–838, D. Van Nostrand Co., New York.

Proceedings of the International Conference on the Peaceful Uses of Atomic Energy, Aug. 8–20, 1955, vol. 3, pp. 193–204, 330–360, United Nations, New York.

Proceedings of the Second International Conference on the Peaceful Uses of Atomic Energy, Sept. 1–13, 1958, vol. 12, pp. 207–229, United Nations, New York.

Camille Rougern: Les Applications de l'Explosion Thermonuclear, Paris, editions Berger-Levrault. 5 rue Auguste Comte VI, 1956, pp. 192–194.

REUBEN EPSTEIN, *Acting Primary Examiner.*

CARL D. QUARFORTH, ROGER L. CAMPBELL, LEON D. ROSDOL, WILLIAM G. WILES,
*Examiners.*